May 10, 1949.  E. M. CALLENDER ET AL  2,470,067
WELDING CURRENT INDICATOR AND LOCK-OUT
Filed Feb. 24, 1944  2 Sheets-Sheet 1

INVENTORS.
Edwin M. Callender.
Robert S. Phair
BY Herbert D. Van Sciver.
ATTORNEY

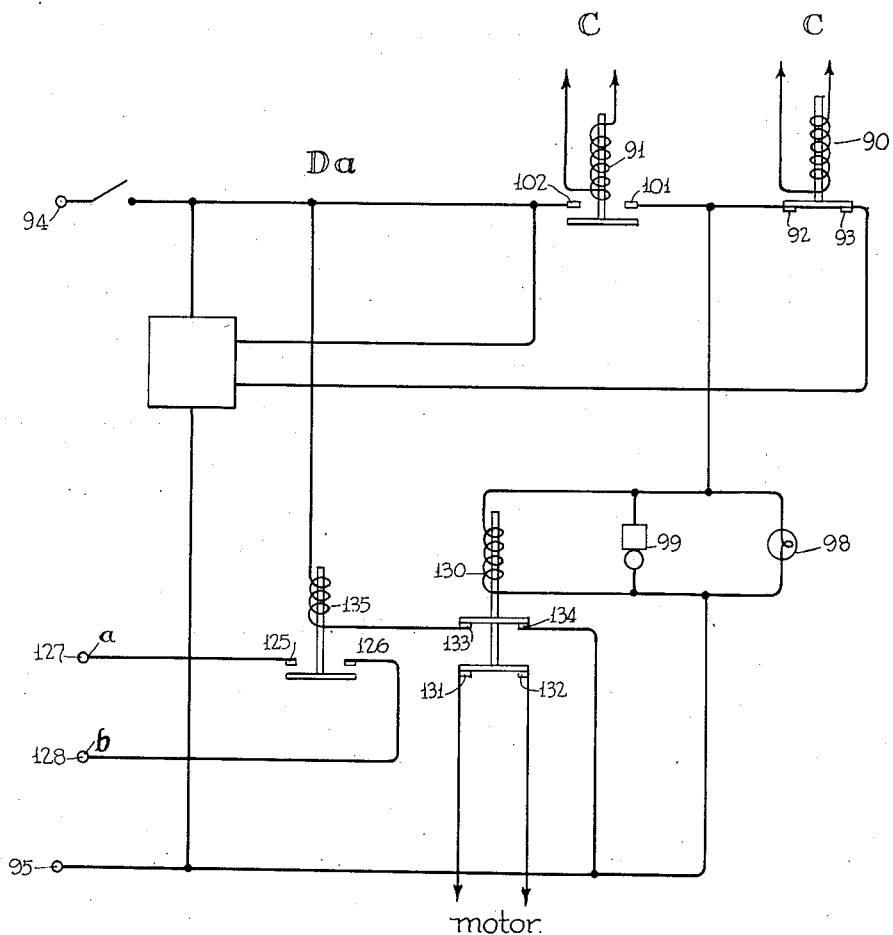

Patented May 10, 1949

2,470,067

UNITED STATES PATENT OFFICE 2,470,067

WELDING CURRENT INDICATOR AND LOCKOUT

Edwin M. Callender, Cynwyd, Robert S. Phair, Philadelphia, and Herbert D. Van Sciver, Merion, Pa., assignors to The Budd Company, Philadelphia, Pa., a corporation of Pennsylvania Application February 24, 1944, Serial No. 523,692

5 Claims. (Cl. 177—311)

This invention relates to an electrical system for indicating limits in current flow. More particularly the invention relates to apparatus and circuits for visually or audibly indicating current limits or effecting disconnection of the controlled circuit at such limits. The invention is useful in any operating circuit but has particular utility in connection with seam welding where power is applied with substantial continuity, there being a series of weld applications as distinguished from the single application of spot welding.

In spot resistance welding means have been devised which effectively control the approximate heat at the weld. This is of considerable practical importance as affording a gauge or standard for determining the soundness of the weld and consequently the strength of the welded structure. However, the means applicable to spot welding are not, in general, satisfactory for seam welding. There are several reasons for this, including the difference in the mode of current application and the difficulty of providing a high frequency indicating meter which will not burn out on overload or be damaged by needle swing.

Objects of the present invention include the provision of means for indicating the limits of current for said seam welding, for providing indicating circuits which may be utilized for visual or audible indicators; for providing indicating means of substantial ruggedness for continuous current operation; for providing automatic lockout apparatus for seam weld and similar circuits; for providing lock-out means for main circuit current variation which operates within a satisfactory range of sensitivity; and for providing current lock-out means adjustable to any degree of percentage variation of current.

The objects of the invention are effectuated by the circuit and circuit apparatus hereinafter described and shown in the accompanying drawings, in which:

Figure 2 is a view showing the accessory lock-out circuit.

Figure 1:
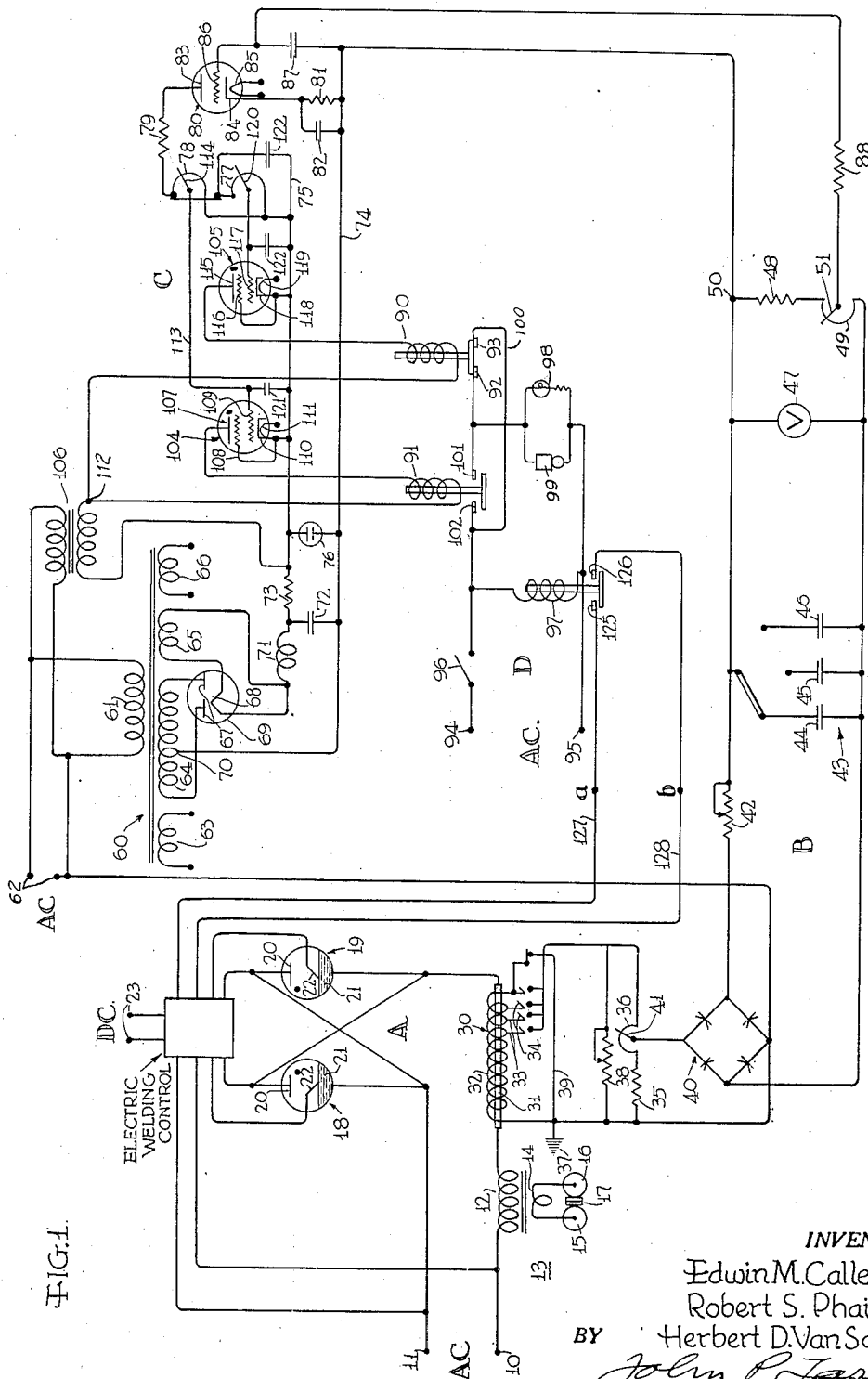
Figure 1 is a view showing a diagram of the indicating circuit.

Referring to Figure 1, the circuit is divided into sections A, B, C and D, A indicating the welding circuit, B the indicator, C the indicator reference circuit, and D the initiating and indicator operating circuit.

The welding circuit A is diagrammatic of the conventional electronically controlled resistance welding circuit as utilized in seam welding. The main alternating current power source is indicated by the mains 10 and 11 with the primary 12 of the welding transformer 13 connected in series. The secondary 14 of the welding transformer has connection to the roller electrodes 15 and 16, which are shown placed in juxtaposition with reference to the workpiece 17.

Also in series with the primary 12 of the welding transformer 13 are ignitrons 18 and 19 connected in inverse parallel, each having anodes 20, pool cathodes 21 and igniter elements 22. By the term "inversely connected" is meant the usual connection of one side of the power source and the welding transformer primary to the cathode of one tube and the anode of the other so that advantage may be taken of both positive and negative half cycles of the source current. The timer control is one of the conventional forms and is shown as connected to the anodes 20 of the ignitrons, the igniters 22, and a direct current power source 23. The timer with its accessory circuits functions to control the time of weld current flow, the time between welds and the amount of energy per weld.

The control circuit B is related to the primary circuit of the power source mains 10—11 and includes a current transformer 30 having a primary 31 of a single conductor section, and a closely coupled secondary 32 surrounding the primary, having a plurality of taps 33 for modifying the transformer ratio. These taps are connected to switches 34 and through a resistor 35 and a potential divider 36 to the ground 37 and the outer end of the secondary 32. Additional variable shunt resistor 38, and a short circuiting shunt 39 to prevent excessive voltages on disuse of the indicator circuit, are also provided.

Included also in the control circuit B is a rectifier 40 connected at its input points to the grounded end of the current transformer and to the movable arm 41 of the potential divider 36. The rectifier provides rectified current through a variable resistor 42 to the capacitor bank 43 including capacitors 44, 45, 46 the latter having selective switch connections to the resistor side of the rectified circuit whereby the uni-directional and on-off undulations of the rectified current may be controlled at will. A volt meter 47 is connected in shunt with the capacitor bank 43, this meter being highly damped and sensitive for low voltages. The capacitor bank 43 assists in providing stable needle indications in this meter and fairly uniform voltage on the output terminals 50 and 51 of this branch circuit. A resistor 48 in series with a potential divider 49 is also connected in shunt with the volt meter 47. The point 50 constitutes the zero point, the potential between this zero point and the arm 51 of the potential divider 49 varying with the effective current in the welding circuit.

In order to establish a percentage relationship in the variation of voltage in the resistor 48 of the control circuit to a reference circuit provision is made for a constant potential reference circuit C as shown in connection with the control circuit. This circuit includes an alternating current transformer 60 having a primary 61 connected to source mains 62 and secondaries 63, 64, 65 and 66. Secondaries 64 and 65 form constituent parts of a rectifying circuit, the terminals of secondary 64 connecting to the anodes 67, and the terminals of secondary 65 having connection to the filament 68 of the rectifying tube 69. The mid-point 70 of the secondary 64 forms one side of the rectified circuit and constitutes the zero line having connection with the point 50 in the control circuit. A filter, including the choke 71, capacitor 72, and resistor 73, cooperates in producing a direct current voltage between the zero line 74 and the direct current potential line 75. In order to establish a constant potential between these lines of potential differences, a glow tube 76 is connected between them as shown. The load of this rectified constant potential circuit includes the two potential dividers 77 and 78 connected in parallel, the resistor 79 and the vacuum tube 80 together with the bias resistor 81 and bias capacitor 82. The tube 80 is a triode, the anode 83 of which is connected to the resistor 79, the indirectly heated cathode 84 being connected to the bias resistor 81. The heating filament 85 of tube 80 is connected to the secondary 66 of transformer 60 and the grid 86 is connected to a branch circuit leading from the reference line 74 through a capacitor 87 and resistor 88 to the movable arm 51 of the potential divider 49 in the control circuit. The connection of the grid is at a point intermediate the resistor 88 and capacitor 87. The point 50 on the other side of the resistor 48 is connected directly to the zero line 74 of the reference circuit C.

It thus appears that by means of the circuit described to this point a constant potential direct current may be passed through the tube 80, the value of the current through the tube and consequently through the potential dividers 77 and 78 varying directly in accordance with the variation of the potential of grid 86 which in turn varies directly with the variation in potential across the resistor 48 and potential divider 49 of the control circuit. It is of course understood that the adjustment of the resistors is such as to permit the tube 80 to operate upon the straight line section of the grid-voltage plate current characteristic curve so as to obtain the mentioned linear variation.

The variation in current in the load circuit is utilized practically to indicate the limits of a predetermined current flow in the welding circuit by means of the operating branch circuit D. This operating circuit comprises essentially two relays 90 and 91, relay 90 being normally energized and its switch open during the welding or other operation and relay 91 being normally deenergized and its switch open during the normal operating range. The relay 90 on a diminution of current to the lower limit closes its switch which is effective to indicate by means of visual or audible signals the lower limit of current variation. Similarly relay 91, when the upper limit of current flow is reached, functions to close its switch and indicate the upper limit of current flow. As shown, a circuit may be established from the alternating current source 94 and 95 through the initiating switch 96 and a timer relay coil 97, the latter serving to close contacts 125, 126 in circuits 127, 128 to begin the timing cycle in the timing control mechanism not herein shown. When this circuit also is closed current passes through normally closed switch contacts 92 and 93, the lamp 98 and the bell 99, the latter operating only on the beginning or ending of current flow. It is pointed out that the circuit from source point 95 is through the lamp and bell to closed relay contact 92, the circuit from 93 being through the shunt conductor 100 and initiating switch 96, to source point 94. Contact point 92 of relay 90 is connected also to contact 101, point 101 and the companion contact 102 forming points of engagement with the armature of relay 91 which is normally open during operation of the main circuit. It is observed that when the contacts of relay 90 are open and the contacts of relay 91 are closed the bell and lamp circuit passes through the contacts of relay 91 to complete the operating circuit 94—95.

In order to operate the relays 90 and 91 at the limit points of current flow in the main circuit electronic means are provided which are effective to pass current at these limits. Accordingly the operating circuit includes two gas-filled tetrodes or thyratrons 104 and 105, one being in series with each relay and each relay thyratron branch circuit forming parallel branches across an alternating current source through transformer 106. Thyratron 104 includes the usual anode 107, screen grid 108, control grid 109 and indirectly heated cathode 110, the filament 111 having connection to the secondary 63 of transformer 60 for its heating current. The anode 107 is connected to one end of the relay 91, the other end having connection to the point 112 at the transformer 106. Screen grid 108 has connection to the cathode, and the control grid 109 is connected by conductor 113 to the contact arm 114 of the potential divider 78. Also thyratron 105 has an anode 115, screen screen grid 116, control grid 117, cathode 118 and filament 119, the filament being connected also to secondary 63 of transformer 60, screen grid 116 being connected to the cathode and the control grid 117 to the movable arm 120 of the potential divider 77, and the anode 115 having connection through relay 90 to transformer point 112. The cathodes of both thyratrons are connected directly to the direct current potential line of the operating branch circuit and both control grids are connected to the same line through capacitors 121 and 122.

The operation of the circuit may now be described as utilized in connection with the resistance seam welder. It is assumed that the workpiece 17 is in place and that the roller welder electrodes 15 and 16 are under compression and the other accessory equipment including the cooling apparatus is functioning properly for the welding operation. Also the coil of relay 90 is energized to open its contacts 92, 93. The initiating switch 96 is then closed thereby causing current to flow through the timer relay 97 thus bringing about closure of miscellaneous timing circuits and initiation of the electronic welding control. Current thereupon flows in the welding transformer 13 and simultaneously in the current transformer 30. A predetermined Voltage is then applied across the rectifier 40 and made effective across the resistor 48 thus producing at the resistor a voltage variable directly in accordance with variation in current flow. Because of the capacitor bank 43 the voltage value imposed on the grid 86 of tube 80 approximates a constant percentage of the average value of the on-off load current. This voltage variation is imposed upon the grid 86 of tube 80 in the load circuit of the constant potential reference circuit C so that in the potential dividers 77 and 78 of this load circuit, variation of the variable current of control resistor 48 is imposed upon the reference circuit. From these resistors 77 and 78 conductors lead to control grids in the thyratrons 104 and 105, 104 being normally non-conducting during the welding operation but becoming conductive on excess current flow when the current reaches and exceeds the upper limits of its normal current range in the welding circuit. Thyratron 105, however, is normally conductive prior to initiation of the welding cycle and also during the cycle is conductive within the normal range of the average welding current flow. Should, however, the current in the welding circuit diminish and fall below the lower limit of its normal range, the control grid 117, activated from the resistor 77 of the reference circuit, functions to stop the flow of current in the thyratron circuit thereby deenergizing the relay 90 and permitting the contacts 92 and 93 to close. There will result accordingly a visual signal in the lamp 98 and an audible signal in the bell 99 to indicate that the current flow of the welding circuit is below the normal range and, consequently, the equipment requires adjustment for the securing of proper welds.

While only indicators, such as a lamp or bell, have been referred to as employed for signaling the operator that the welding current is either too strong or too weak, it is obvious that the signaling circuit may be led through a recording instrument which will give a permanent record of the variation of current in the weld circuit. It should also be understood that relays 90 and 91 may be used to cause lock out of the seam, welding or other circuits as illustrated in Fig. 2, thus constituting also an indication of current limits in the load circuit. In this figure is shown a modified D circuit section Da which may be substituted for the D section of Fig. 1 with external connection at 94, 95 as in the D section and similar connections to contacts 92, 93 of relay 90 and contacts 101, 102 of relay 91.

In accordance with this modified circuit, the relay coil 130 is substituted for relay 97 of Fig. 1 and placed in parallel with the lamp and bell 98, 99. Relay 130 functions when energized at the current limits to open the weld roller motor circuit contacts 131, 132 and, also, to open the contacts 133, 134 in the circuit of relay 135, whereupon contacts 125, 126 of the timer circuit 127, 128 are opened, thereby causing the welding circuit to open. A time delay relay device, shown in Fig. 2 as a square box, is connected between lines 94, 95 to keep current from the idle-closed contacts 92, 93 until relay 90 is energized to open them.

It is pointed out that the voltage meter 47, as used in the control circuit, provides means for indicating the voltage of the rectified current and as such it may be used independently of the circuits C and D. This provides a simple control which is not subject to burning out on slight overload as in the case of thermo-couple meters. This permits adjustment of the resistances so that the appropriate values may be effective on the reference circuit. These adjustments are provided primarily by the resistors 38, 35, 36 and 42, as well as the capacitors 44, 45 and 46. The various taps 33 on the current transformer 30 are also useful for bringing the apparatus into proper adjustment with the working range of current in the welding circuit.

It is pointed out that while the control is broadly responsive to current, time also is involved due to variation of time constants with current magnitude from on to off position, and, hence, the control may be stated to be a function of the product of current and time.

This is true because of the time lag of the capacitor bank 43 and since resistances are coordinated in both on and off positions so that in these positions time, as well as current magnitude, are interpreted by the meter.

In order that the invention may be set forth with greater clarity, it has been described in connection with a resistance seam welding circuit. However, since the apparatus functions on limit changes in current flow, it is apparent that the same may be usefully applied to other types of working circuits. Modifications, other than as indicated, may be made and, hence, the invention should be interpreted only in connection with the claims as hereto appended.

What is claimed is:

1. A weld current indicator circuit comprising a welding circuit, a control circuit operable on energization to initiate supply of variable welding current in recurrent intervals to said welding circuit, and means responsive to the magnitude of average current in the welding circuit over a time period including said recurrent intervals for indicating an average current limit of a predetermined welding circuit range, said means comprising a constant potential branch circuit, including a vacuum triode, a current transformer connected to said welding circuit, a resistor, a rectified current branch circuit connected across said transformer and resistor, a capacitor connected across said resistor, connections from the cathode and grid of said tube to opposite ends of said resistor, and means connected to the anode of said tube for indicating a limit of current change in said welding range.

2. A current limit indicator comprising a main circuit, a control circuit operable on energization to initiate supply of variable current in recurrent intervals to said main circuit, a transformer connected to said main circuit, a resistor, a rectified current branch circuit connected across said transformer and resistor, a capacitor connected across said resistor, a constant potential cicuit including a load tube having an anode, cathode and control grid, connections from the cathode and grid of said tube to opposite ends of said resistor, and means connected to the anode of said tube, and dependent on variation of current through said resistor, for indicating a limit of current change in said main circuit over a time period including said recurrent intervals.

3. A current limit indicator comprising a main circuit, a control circuit operable on energization to initiate supply of variable current in recurrent intervals to said main circuit, a transformer connected to said main circuit, a resistor, a rectified current branch circuit connected across said transformer and resistor, a capacitor connected across said resistor, a constant potential circuit including a glow tube, a load tube having an anode, cathode and control grid, connections from the cathode and grid of said tube to opposite ends of said resistor, and means connected to the anode of said tube, and dependent on variation of current through said resistor, for indicating upper and lower limits of current change in said main circuit over a time period including said recurrent intervals.

4. A current limit indicator comprising a main circuit, a control circuit operable on energization to initiate supply of variable current in recurrent intervals to said main circuit, a current transformer connected to said main circuit, a rectified current branch circuit including a direct current rectifier connected across said transformer, a capacitor and resistor connected across said rectifier, a constant potential circuit including a load tube having an anode, cathode and control grid, connections from the cathode and grid of said tube to opposite ends of said resistor, and means connected to the anode of said tube, and dependent on variations of current through said resistor, for indicating a limit of current change in said main circuit, said means comprising two parallel resistors, each having variable contacts forming voltage dividers, two gas thermionic tubes, each having an anode, a cathode and a control grid connected to one of said voltage divider contacts, a power relay connected to the cathode and anode of each gas tube, and indicating means operable by each of said relays, said voltage divider contacts being set to energize said gas tubes at predetermined limits of current flow through said resistor.

5. A current indicator circuit comprising a load circuit, a first control circuit operable on energization to supply variable current in recurrent intervals to said load circuit, a second control circuit connected to the load circuit, means in said second control circuit including a capacitor for establishing and maintaining a continuous voltage therein proportional to the average current of the load circuit over a time period including said recurrent intervals, power translating apparatus, power means connected to said apparatus and second control circuit operable at predetermined values of current in said second control circuit for energizing said apparatus, and means for establishing a common voltage point of reference between said second control circuit and power means to provide an indication of the limiting current values in said second control circuit.

EDWIN M. CALLENDER.
ROBERT S. PHAIR.
HERBERT D. VAN SCIVER.

REFERENCES CITED

The following references are of record in the file of this patent:

UNITED STATES PATENTS

| Number | Name | Date |
| --- | --- | --- |
| 2,130,440 | Willis et al. | Sept. 20, 1938 |
| 2,138,790 | Heitman, Jr. | Nov. 29, 1938 |
| 2,159,751 | Saul | May 23, 1939 |
| 2,261,686 | Kesselring | Nov. 4, 1941 |
| 2,310,112 | Palmer et al. | Feb. 2, 1943 |
| 2,313,975 | Spear et al. | Mar. 16, 1943 |
| 2,335,382 | Bonanno | Nov. 30, 1943 |
| 2,369,678 | McWhirter et al. | Feb. 20, 1945 |
| 2,377,506 | McWhirter | June 5, 1945 |
| 2,422,766 | Alexander | June 5, 1945 |